(12) United States Patent
Krishnan et al.

(10) Patent No.: US 6,502,175 B1
(45) Date of Patent: Dec. 31, 2002

(54) METHOD AND APPARATUS FOR LOCATING CACHES IN A NETWORK TO OPTIMIZE PERFORMANCE

(75) Inventors: P. Krishnan, Matawan, NJ (US); Danny Raz, Aberdeen, NJ (US); Yuval Shavitt, Marlboro, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/282,760

(22) Filed: Mar. 31, 1999

(51) Int. Cl.[7] ................... G06F 12/00; G06F 15/177
(52) U.S. Cl. .............. 711/170; 711/119; 711/118; 709/220; 709/221; 709/226; 709/223
(58) Field of Search ................. 711/118, 119, 711/170; 703/14, 21, 22, 24; 709/226, 223, 104, 105, 203, 220, 221

(56) References Cited

U.S. PATENT DOCUMENTS

| | | | | |
|---|---|---|---|---|
| 5,511,208 A | * | 4/1996 | Boyles et al. | 709/223 |
| 5,852,717 A | * | 12/1998 | Bhide et al. | 709/203 |
| 5,864,852 A | * | 1/1999 | Luotonen | 713/201 |
| 5,878,218 A | * | 3/1999 | Maddalozzo, Jr. et al. | 709/213 |
| 5,999,734 A | * | 12/1999 | Willis et al. | 709/200 |
| 6,038,601 A | * | 3/2000 | Lambert et al. | 709/226 |
| 6,058,423 A | * | 5/2000 | Factor | 709/226 |
| 6,189,043 B1 | * | 2/2001 | Buyukkoc et al. | 709/223 |

OTHER PUBLICATIONS

Gwertzman, "The Case for Geographical Push–Caching," Proceedings, Fifth Workshop on Hot Topics in Operating Systems, May 4–5, 1995, pp. 51–55.*

* cited by examiner

Primary Examiner—Glenn Gossage

(57) ABSTRACT

A method and apparatus for determining locations for and placing k caches in a network for optimizing performance of a network parameter. The method includes the steps of selecting a placement parameter l that is greater than 0, assigning l caches to l arbitrary nodes in the network, selecting l caches to remove from the network, assigning l+1 caches to every possible location in the network, computing and recording network performance data on the network cost parameter for each location and for each selection of l caches, determining a location where the network performance data on the network cost parameter computed and recorded is optimized, assigning l+1 caches to the determined location, and repeating the above steps of selecting l caches, assigning l+1 caches, computing and recording network performance, determining a location, and assigning l+1 caches for k−1 iterations.

8 Claims, 4 Drawing Sheets

METHOD AND APPARATUS FOR LOCATING CACHES IN A NETWORK TO OPTIMIZE PERFORMANCE

FIELD OF THE INVENTION

The present invention relates to wide-area networks and, more specifically, to a method and appratus for determining an optimal location for caches in a wide-area network.

BACKGROUND OF INVENTION

Internet usage is expanding at a phenomenal rate. As Internet users become more sophisticated, their demands for information and network performance become greater and they become less tolerable of having to wait more than a few seconds for information to be transferred from a server. For world-wide-web (i.e., "WWW") traffic, network performance depends on a number of factors. For example, server response time (i.e., the length of time it takes for a server to respond to a user's request) slows as the number of users (the terms user and client are used interchangeably herein) accessing the server increases. The type of information (text-only, video, etc.) requested also effects server response time, text-only data consuming less bandwidth and generally being transmitted more quickly than video data, for example. In addition, physical network limitations such as the user's modem speed, communication route between the user and server (i.e., how many hops the request from the user and information from the server must navigate), the location and number of routers and caches (i.e., network configuration), the speed of the line or link, and other physical factors, may effect server response time.

The case of optimizing performance for clients of a particular web-server is of particular interest both from the theoretical and practical points of view. Consider a popular server that gets many requests and responds with large quantities of data (like big software and news distribution servers). As the number of requests to the server and the data it provides increase, the performance of the server declines sharply. One way to address this problem is to replicate the server. However, explicit replication creates problems with managing the different copies of data maintained on the different servers and redirecting the client to different locations instead of being routed directly to the "original" server. Consequently, hardware and network management costs increase with this solution.

Another solution is to place more caches in the network. Caching improves network and system performance for world-wide-web (WWW) browsing by saving network bandwidth, reducing client access time, and alleviating server load. The way caches are currently deployed requires clients or caches to be cognizant of proximately located caches. This complicates network and system management and configuration.

Automatic caching is an attractive proposition. The question of where to locate caches in the network is an important one and one which may have a big impact on the overall improvement in network performance. If caches are located very close to the server, the server load may decrease but network congestion will remain a problem. Locating caches too close to the clients would require a large number of caches that would each be under-utilized.

Caches have historically been located at the network edges in the form of browser and proxy caches, at the ends of high latency links, or as part of cache hierarchies. Recently, it has been suggested that caches be placed inside the network, i.e., inside the network backbone, as opposed to at the network edges. Such cache placement has been shown to reduce network FTP (file transfer protocol) traffic. While offering some improvement in network performance, merely locating caches inside the network does not provide an optimal solution to network performance concerns. Moreover, the "in-network" approach, in and of itself, does not provide a method for optimizing network performance or gain (i.e., minimizing overall network traffic and/or reducing server response time or delay). Clearly, how well caching inside the network will work depends on where the caches are located, and how data is disseminated to them.

SUMMARY OF THE INVENTION

In view of the above-described shortcomings of the prior art, it is thus desirable to provide a method of determining locations for caches within a network that optimizes a predetermined network cost parameter.

In a first embodiment of the present invention, a so-called l-greedy algorithm is used to determine locations for k caches in a network having virtually any configuration. In a second embodiment of the present invention, a dynamic-programming algorithm determines optimal locations for k caches in a network for the traffic related to a single server. In accordance with the present invention, caches are preferably co-located with network routers and may be maintained by network providers. Thus, little or no change is required to the network infrastructure, except for the introduction of caches at the appropriate locations within the network. The present invention is particularly, although not exclusively, well-suited for a single web-server connected to a network, where the route from the server to the client forms a tree (with the server at the root of the tree).

In a first embodiment, the present invention provides a method of determining locations for k caches in a network. A network configuration is defined by a plurality of network connections, a plurality of nodes, and a plurality of servers and clients and network performance is determined by the interrelation therebetween and there among. The locations determined for k caches optimizes performance of a network cost parameter which is dependent upon the network configuration. The method comprises the steps of: selecting a placement parameter l that is greater than 0; assigning l caches to l arbitrary nodes in the network; selecting l caches from the network; assigning l+1 caches to every possible location in the network; computing and recording network performance data on the network cost parameter for each location and for each selection of l caches; determining a location where the network performance data on the network cost parameter is optimized; assigning l+1 caches to the previously determined location where the cost parameter is optimized; and repeating the previous steps for k−l iterations.

In a second embodiment of the present invention, a dynamic programming algorithm is used to determine the optimal location of a cache in a network having a single server. In this embodiment, the present invention uses a dynamic programming algorithm to compute the optimal cost $C(i, \hat{k}, s)$ to determine an optimal location for caches in a network having a single server, where i is a node, $\hat{k}$ is the number of optimally placed caches, and s is the distance between node i and the next cache in the network.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference characters depict similar elements throughout the several views.

DETAILED DESCRIPTION OF THE PREFERRED EMBODIMENTS

The present invention is directed to a method of placing caches in a network. In contrast to prior art cache placement methods and algorithms, which do not reconsider or reevaluate the location of previously placed caches, the present invention provides the ability to reconsider the location of previously placed caches when determining a location for a new cache, and may relocate previously placed caches if a more optimal location for such caches is determined.

Figure 1:
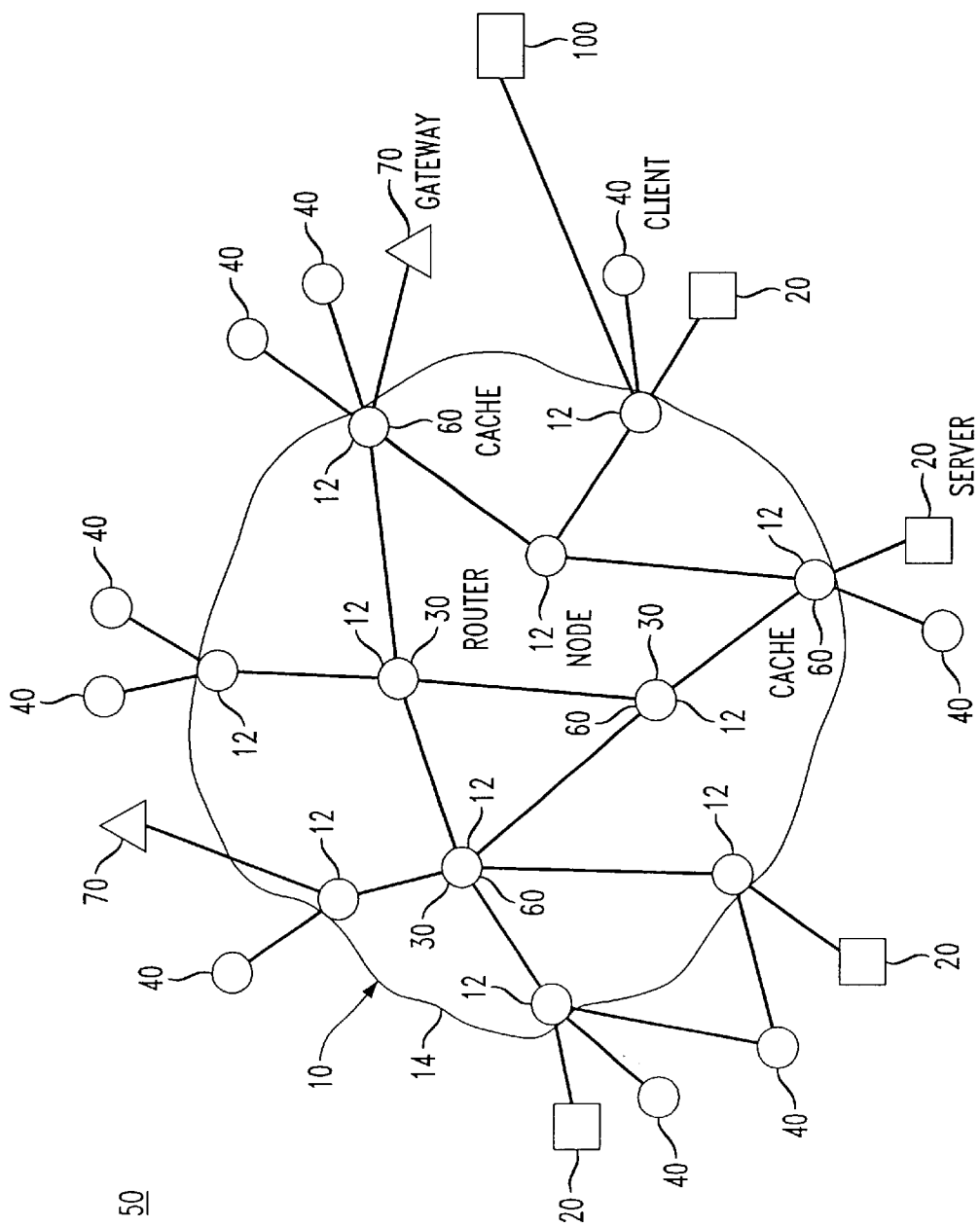
FIG. 1 is a schematic diagram of a wide-area-network having a plurality of servers, nodes and clients.

Referring now to the drawings in detail, FIG. 1 schematically depicts a wide-area-network (WAN) 10 that defines a network edge 14 and that constitutes a part of the world-wide-web (WWW) 50. Located within the WAN 10 are a plurality of routers 30, each located at a node 12. When links are used as a measure of distance between nodes, they are referred to as hops. The shortest number of links between any two nodes 12 in the WAN 10 is referred to herein as a hop count.

Located outside or inside of the WAN 10 are a plurality of servers 20, clients 40, or gateways 70 to other networks. When a client 40 requests information (e.g., text-only data, video data, etc.) from a server 20, the information is sent to the client 40 over the shortest path from the server 20 to the client 40. When caches 60 are located in the WAN 10, preferably at a node 12, the client's request may be satisfied by a cache 60 if an up-to-date copy of the requested information is located at the cache 60 thereby shortening the distance between the client and the requested information, and effectively decreasing server response time. If the cache 60 does not have a current copy of the requested information, the request is forwarded to the server 20 which provides the requested information to the client 40. The performance of a caching scheme is a function of the network topology, the request pattern from the client, the assignment of caches to requests, the cache sizes, and the location of the caches, and the configuration of the network. Caches 60 located close to a server 20 may decrease the load on the server 20, but may not address network congestion. Locating caches 60 close to clients 40 may address network congestion but will also require a large number of caches 60, with each cache most likely being under-utilized.

A network management computer 100 may be connected to the network 10, and may include network configuration management hardware and software that enable network configuration, network performance, and various other network related information to be accessed, acquired, recorded, and controlled. Alternatively, the computer 100 may not be connected to the network 10, and network related information may be provided using other known means and methods (e.g., magnetic tape).

Figure 2:
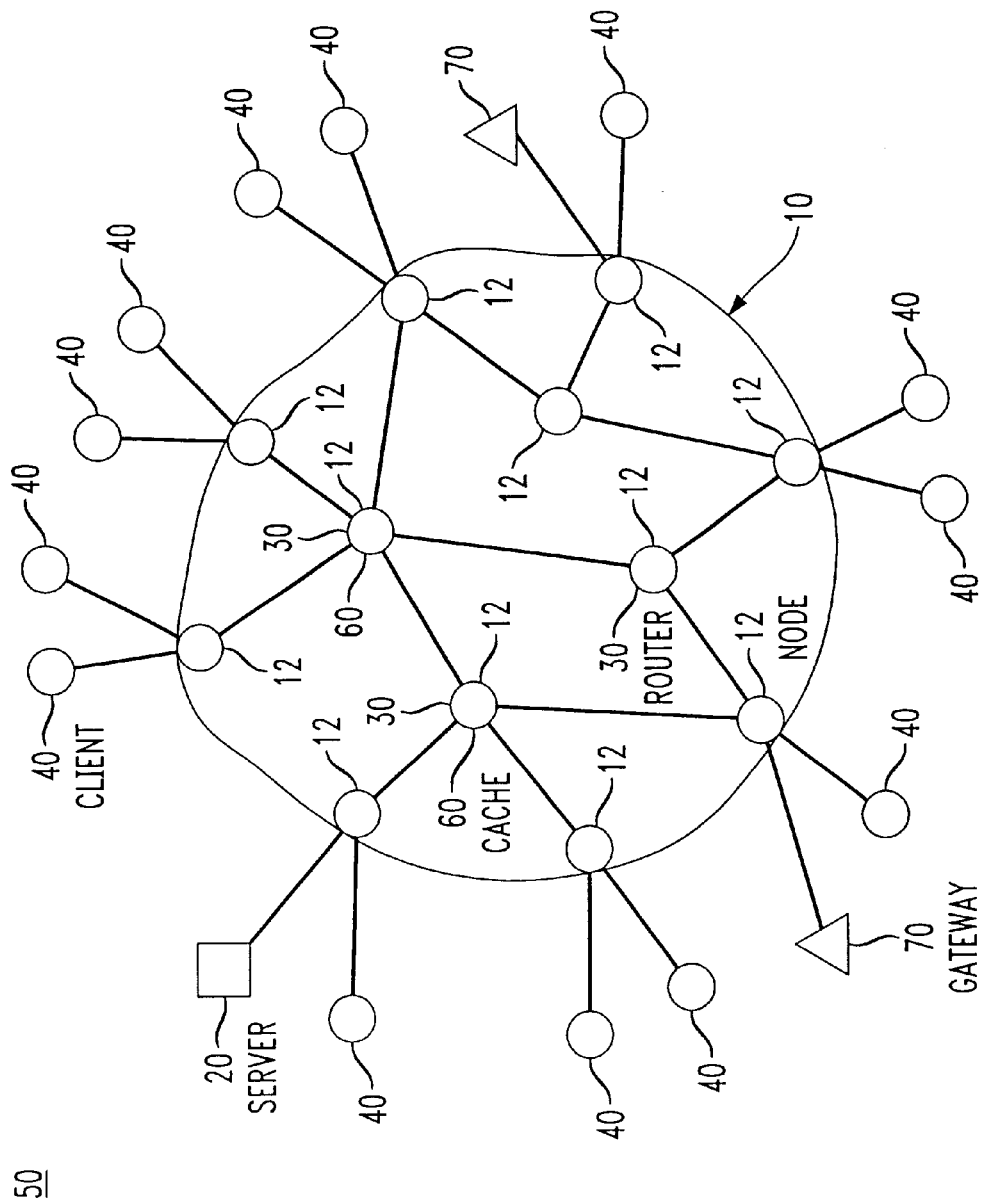
FIG. 2 is a schematic diagram of a wide-area network having a single server and a plurality of nodes and clients.

Referring next to FIG. 2, a wide-area network 10 is there depicted having a single server 20 and a plurality of clients 40, nodes 12, routers 30, caches 60 and gateways 70 to other networks. The WAN 10 is depicted as being connected to and comprising a part of the world-wide-web 50, although this need not be the case.

The solution to the cache location problem depends heavily on the client request pattern experienced by the server 20 and the routing algorithm in the network. While this may seem to suggest a constantly varying request pattern, such is not the case. Although the actual set of clients 40 (from a server's 20 perspective) may vary significantly, the overall request pattern experienced by the server 20 is stable. For example, for a software distribution server, the request typically requires a software download from the server 20 to a client 40 in a certain sub-network, regardless of the actual set of clients 40. Thus the flow, or the bytes sent to the client 40 in the sub-network by a server, do not vary to any significant degree. As used herein, the term "sub-network" refers to a collection of nodes within the network that are administered by a single entity.

The caches 60 referred to herein are what are known as transparent en-route caches (TERCs) (the terms cache and TERC are used interchangeably herein). These caches are only effective when located along routes from clients 40 to servers 20, and are placed transparently to the servers 20 and clients 40. A TERC intercepts every request that passes through it and either satisfies the request (if the information requested is resident in the TERC) or forwards the request towards the server 20 along a previously defined routing path.

When analyzing a network in terms of its performance, various criteria may be considered. For example, a network administrator may be interested in maximizing the amount of data that passes through the network. Alternatively, the administrator may be interested in minimizing the server response time or minimizing overall network traffic or flow (thus reducing server response time). Other criteria may also be considered, depending upon the specific performance requirements of the network. These criteria are generally referred to as a "cost" parameter, and the overall goal in designing, configuring or reconfiguring a network is to optimize a particular cost parameter, i.e., to optimize the performance of the network with regard to a specific cost parameter. In a general sense, the cost parameter may be considered any parameter which may represent network performance and which may be evaluated to improve or enhance network performance.

There are a number of situations in which it is desirable to determine locations for caches 60 in the WAN 10 that will optimize network performance with regard to a specific cost parameter. For example, when designing a new WAN 10, the network administrator typically has limited router 30 and cache 60 resources. Thus, determining optimal location for the caches 60 is essential for ensuring optimal network performance. For already configured networks, it may also be desirable to periodically analyze the number and location of caches 60, and determine whether the existing caches 60 are optimally located and whether additional caches 60 are required to improve network performance. Finally, a network administrator may be given a limited number of additional caches 60 that may be added to the WAN 10. Here it is desirable to determine whether the existing caches 60 are optimally located and to determine the optimal location for the new caches 60. It will be obvious to persons skilled in the art that there will be other instances where determining optimal cache location is desirable, the above-described situations being merely illustrative and non-limiting examples.

Figure 3:
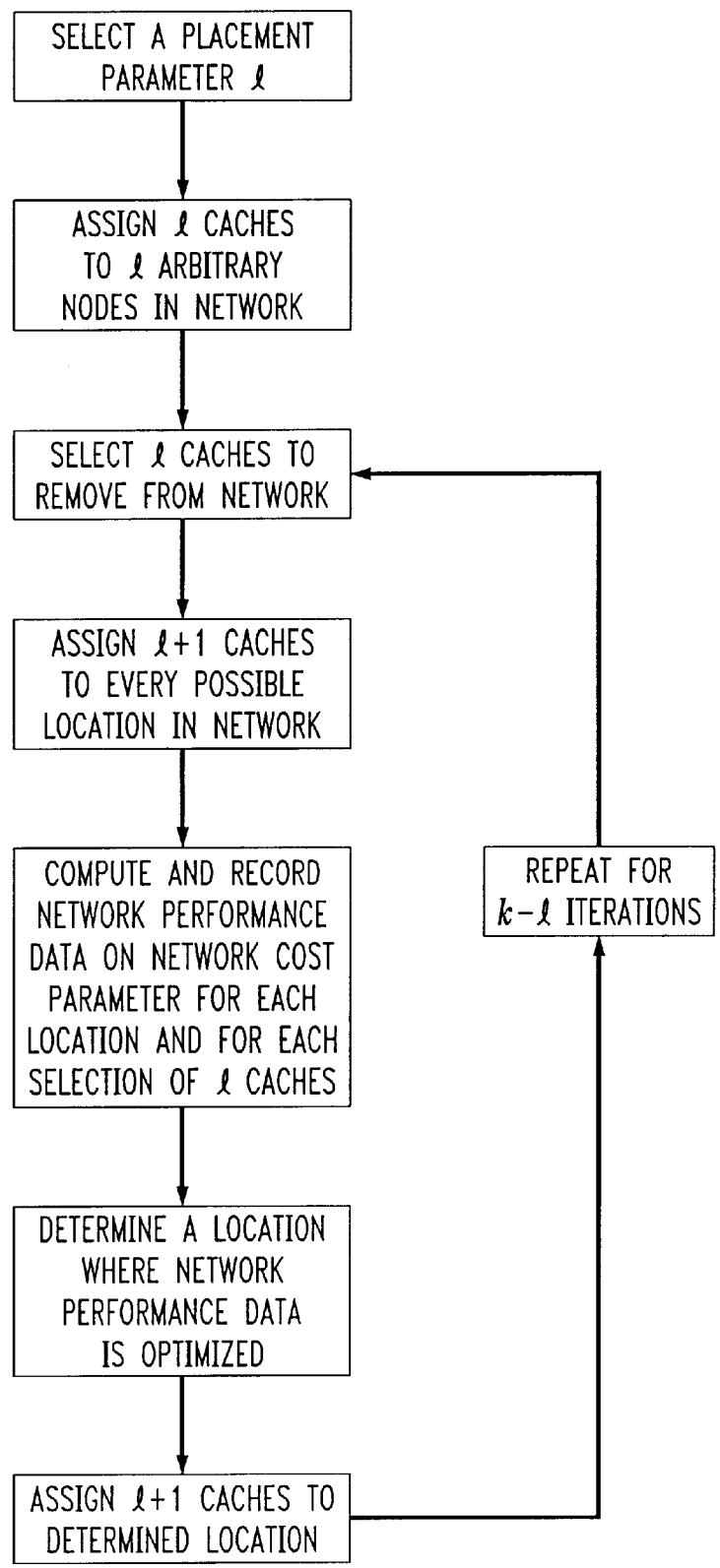
FIGS. 3–5 are flow diagrams of methods of determining locations for k caches in a network in accordance with embodiments of the present invention.
Figure 5:
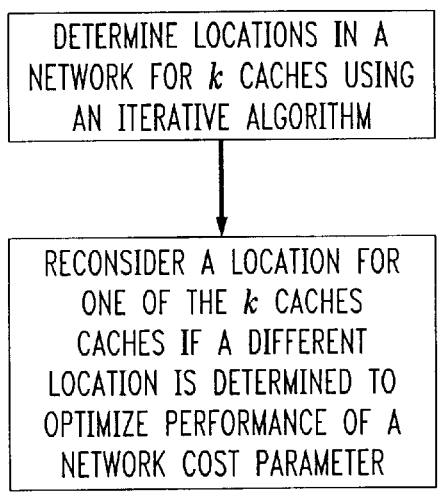

In a first embodiment of the present invention, a so-called l-greedy algorithm is used to determine locations for k caches in a network having virtually any configuration (see, e.g., FIG. 1), as depicted in the flow diagrams of FIGS. 3 and 5. In accordance with the present invention, caches are preferably co-located with network routers and may be maintained by network providers. Thus, little or no change is required to the network infrastructure, save for the introduction of caches at the appropriate locations within the network. The first embodiment of the present invention is well-suited for networks having virtually any combination of servers and clients in virtually any configuration. The variable l is referred to herein as a placement parameter and may be any number greater than 0. In a preferred embodiment, l is 2. As the value for l increases, the cache locations determined in accordance with the present invention are more optimally located and thus provide a greater improvement or optimization of the desired network cost parameter.

The prior art greedy algorithm (i.e., where l=0) places caches 60 in the WAN 10 iteratively in a greedy fashion, i.e., without reconsidering the location of previously placed caches 60. That is, this greedy algorithm checks each node 12 of the network to determine where to place a first cache 60, and chooses the node 12 that optimizes a preselected cost parameter. The greedy algorithm assigns the first cache 60 to this node 12, updates the flows on the network due to this cache 60, i.e. acquires network performance data on the preselected cost parameter, and looks for an appropriate location for the next cache 60.

The terms "assign" and "remove" are used herein in a figurative sense. The present invention does not actually assign or remove caches 60. Rather, a software program, for example, running on a general purpose computer 100 (see FIG. 1), performs a number of iterations to determine locations for caches 60 in the network. The network 10 is modeled on the computer 100 by the software as a plurality of nodes 12, clients 40, servers 20, routers 30, caches 60, etc. based upon network configuration information acquired by the computer 100. The network configuration information may be selectively input to the computer 100 by a network administrator, for example. Alternatively, the computer 100 may be connected to the network 10 and the network configuration may be acquired by the computer 100 using known network management software and/or hardware. In "assigning" a cache to a node 12, the present invention merely marks that node 12 as having a cache 60 for an iteration of the algorithm. The cache 60 is "removed" by marking the node 12 as not having a cache 60, or alternatively, as providing no marking or other indication at that particular node 12.

The step of "computing and recording network performance data" involves computing network performance, such as flow or throughput, for a specific cost parameter based upon a predetermined network configuration, and the location of caches 60 in the network 10, as indicated generally by marked nodes 12.

It will be obvious that the above steps, specifically, and the various embodiments of the present invention, more generally, may be performed in one or a plurality of processors by software, all in a general purpose computer.

Figure 4:
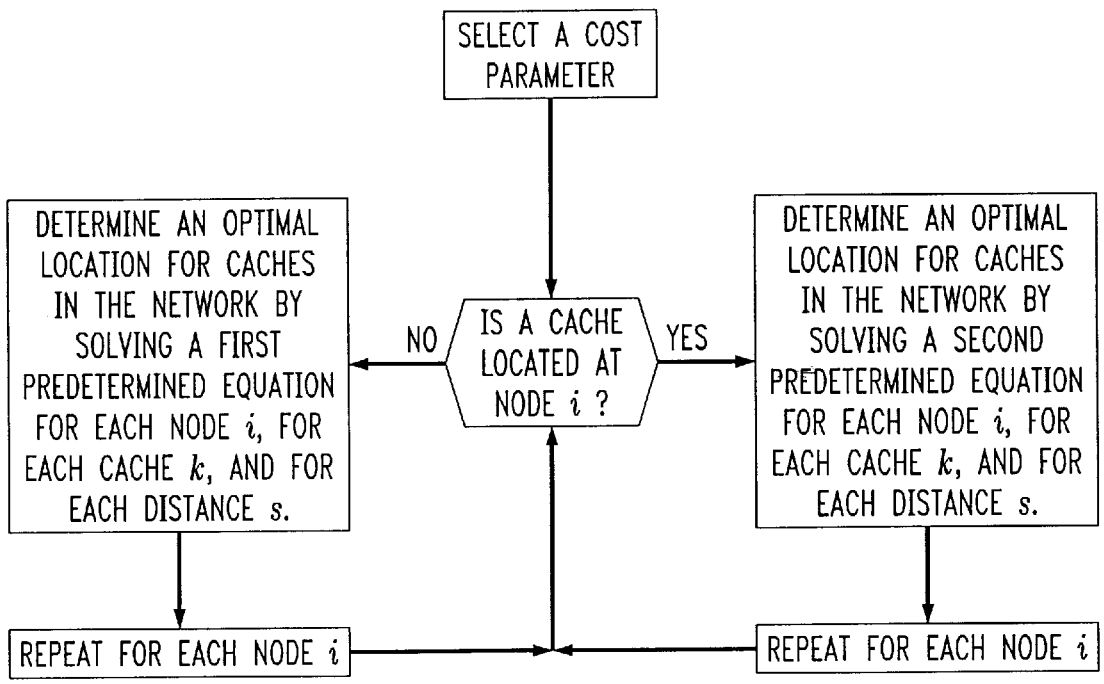

In a second embodiment of the present invention, a dynamic programming algorithm is used to determine an optimal location of caches in a network for the traffic related to a single server (see, e.g., FIG. 4). In this embodiment, the present invention uses a dynamic programming algorithm to compute the optimal cost $C(i, \tilde{k}, s)$ to determine an optimal location for caches in a network for the traffic related to a single server, where i is a node, $\tilde{k}$ is the number of optimally placed caches, and s is the distance between node i and the next cache in the network.

For example, in a network tree having n nodes 12, a set of (at most n) flows representing demands satisfied by a single server 20 located at the root of the tree, and the number of caches, k, the optimal locations for the caches 60 and the total cost can be computed in accordance with the present invention.

First, the general tree is converted into a binary tree by introducing at most n dummy nodes. The nodes 12 are then sorted in reverse breadth first order, i.e., all descendants of a node 12 are numbered before the node 12 itself. For each node i having children $i_L$ and $i_R$, for each $\tilde{k}$, $0 \leq \tilde{k} \leq k$, where k is the maximum number of caches to place, and for each s, $0 \leq s \leq h$, where h is the height of the tree, the optimal cost $C(i, \tilde{k}, s)$, is computed. This quantity $C(i, \tilde{k}, s)$, is the cost of the subtree rooted at i with $\tilde{k}$ optimally located caches 60, where the next cache 60 up the tree is at distance s from i. A flow, $F(i, \tilde{k}, s)$, is associated with each such optimal cost which is the sum of the demands in the subtree rooted at i that do not pass through a cache 60 in the optimal solution of $C(i, \tilde{k}, s)$. If no cache 60 is to be put at node i, then the optimal solution for $C(i, \tilde{k}, s)$ is the one where:

$$\min_{0 \leq k' \leq k} (C(i_L, k', s+1) + C(i_R, \tilde{k} - k', s+1) +$$

$$(s+1)(F(i_L, k', s+1) + (F(i_R, \tilde{k} - k', s+1)) + s \; f_{s,i})$$

If a cache 60 is located at node i, the optimal solution is the one where:

$$\min_{0 \leq k' \leq (k-1)} (C(i_L, k', s) +$$

$$C(i_R, \tilde{k} - s - k', 1) + F(i_L, k', s+1) + (F(i_R, \tilde{k} - k', s+1))$$

While running the dynamic program, the appropriate $F(i, \tilde{k}, s)$ should also be computed and recorded and the program should keep track of the location of the caches 60 in these solutions.

Web caching is a very cost-effective method to deal with network overload. Solutions like TERCs have the advantage that they do not require changes (like a proxy assignment) by a user, and are easy to install and manage locally within a provider network. Therefore, they are attractive building blocks to any future caching strategy. Once installed, the benefit from a device will determine the further use of this solution. The location at which the caches are placed plays a prime role in the resulting traffic and load reduction. Thus, addressing the location problem of caches is an important part in the campaign for Web caching.

The present invention may be carried out in one or a plurality of processors carrying software in a general purpose computer. With the complexity of the first embodiment of the present invention being approximately $k(n^l)$, increasing the placement parameter l will increase the quality of the solution acquired by the algorithm.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method of determining locations for k caches in a network wherein a network configuration is defined by a plurality of network connections, a plurality of nodes, and a plurality of servers and clients and wherein network performance is determined by the interrelation therebetween and thereamong, wherein the locations determined for k caches optimizes performance of a network cost parameter which is dependent upon the network configuration, said method comprising the steps of:

(a) selecting a placement parameter l that is greater than 0;

(b) assigning l caches to l arbitrary nodes in the network;

(c) selecting l caches to remove from the network;

(d) assigning l+1 caches to every possible location in the network;

(e) computing and recording network performance data on the network cost parameter for each location of said step (d) and for each selection of l caches of said step (c);

(f) determining a location where the network performance data on the network cost parameter computed and recorded in said step (e) is optimized;

(g) assigning l+1 caches to the location determined in said step (f); and (h) repeating said steps (c) through (g) for k−l iterations.

2. The method of claim 1, wherein said step (a) comprises selecting a placement parameter that is greater than 0 and less than or equal to 2.

3. The method of claim 1, wherein said step (f) comprises determining a location that is not located at an edge of the network where the network performance data on the network cost parameter computed and recorded in said step (e) is optimized.

4. The method of claim 1, further comprising the step of periodically repeating said steps (a)–(h).

5. A method of determining a location for each of a plurality of caches in a single server network, said method comprising the steps of computing an optimal cost $C(i, \tilde{k}, s)$ using a dynamic programming algorithm, where i is a node, $\tilde{k}$ is the number of optimally placed caches, and s is the distance between node i and a next cache in the network, and determining an optimal location for installation of each of the plurality of caches for network traffic for the single server based on the computed optimal cost, wherein the network has a predetermined number of nodes and a predetermined number of caches located within the network, said step of computing an optimal cost $C(i, \tilde{k}, s)$ using a dynamic programming algorithm comprising the steps of:

(a) selecting a network cost parameter;

(b) where no cache is located at node i, determining an optimal location for caches in the network by solving the following equation for each node i having children $i_L$ and $i_R$, for each cache, $\tilde{k}$ and for each distance s:

$$\min_{0 \le k' \le \tilde{k}} \left( C(i_L, k', s+1) + C(i_R, \tilde{k}-k', s+1) + (s+1)(F(i_L, k', s+1) + (F(i_R, \tilde{k}-k', s+1)) + s \cdot f_{s,i} \right);$$

and (c) where a cache is located at node i, determining an optimal location for caches in the network by solving the following equation for each node i having children $i_L$ and $i_R$, for each cache k and for each distance s:

$$\min_{0 \le k' \le (\tilde{k}-1)} \left( C(i_L, k', s) + C(i_R, \tilde{k}-s-k', s) + F(i_L, k', s+1) + (F(i_R, \tilde{k}-k', s+1) \right)$$

where $C(i, \tilde{k}, s)$ is an optimal cost of a subtree rooted at node i with $\tilde{k}$ optimally placed caches, where the next cache in the network is located at a distance s from node i, $F(i, \tilde{k}, s)$ is a flow associated with optimal cost $C(i, \tilde{k}, s)$ which is the sum of demands in the subtree rooted at node i that do not pass through a cache in the optimal solution of $C(i, \tilde{k}, s)$, C is the cost parameter, $i_L$ is a child of node i located to the left of node i, $i_R$ is a child of node i located to the right of node i, k is a cache budget and $0 \le k' \le \tilde{k} \le k$, s is a distance from node i to the next cache in the network moving away from the server and $0 \le s \le h$, where h is the height of the tree, and $f_{s,i}$ is a flow requested by node i from the server.

6. The method of claim 5, wherein the network cost parameter is minimum network flow.

7. A network having a plurality of nodes, a plurality of clients and a plurality of servers, all interconnected to define a network configuration and wherein network performance is determined by the interrelation therebetween and thereamong, said network comprising:

a plurality of caches at a plurality of locations, wherein the locations of k caches optimizes performance of a network cost parameter which is dependent upon the network configuration, the locations of k caches being determined by a software program operable in connection with a general purpose computer for:

(a) selecting a placement parameter l that is greater than 0;

(b) assigning l caches to l arbitrary nodes in the network;

(c) selecting l caches to remove from the network;

(d) assigning l+1 caches to every possible location in the network;

(e) computing and recording network performance data on the network cost parameter for each location of said step (d) and for each selection of l caches of said step (c);

(f) determining a location where the network performance data on the network cost parameter computed and recorded in said step (e) is optimized;

(g) assigning l+1 caches to the location determined in said step (f); and (h) repeating said steps (c) through (g) for k−l iterations.

8. The network of claim 7, wherein the general purpose computer is connected to said network and wherein the network configuration of said network is determined by obtaining the network configuration directly from said network.

* * * * *